United States Patent
Lang et al.

(10) Patent No.: US 6,382,804 B1
(45) Date of Patent: *May 7, 2002

(54) EXTERNAL MIRROR FOR MOTOR VEHICLES

(75) Inventors: Heinrich Lang, Ergersheim; Wolfgang Seiboth, Bad Windsheim, both of (DE)

(73) Assignee: Mekra Lang GmbH & Co. KG, Fürth (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/804,205

(22) Filed: Feb. 21, 1997

(51) Int. Cl.[7] .............................................. G02B 7/182

(52) U.S. Cl. ........................ 359/872; 359/865; 248/479

(58) Field of Search ................................. 359/855, 865, 359/838, 870, 871, 872, 876, 883; 248/479, 481, 483

(56) References Cited

U.S. PATENT DOCUMENTS

| | | | |
|---|---|---|---|
| 3,291,435 A | * 12/1966 | Herr ............................. | 248/481 |
| 3,375,053 A | 3/1968 | Ward et al. | |
| 3,383,152 A | * 5/1968 | Ward ............................ | 359/514 |
| 3,408,136 A | 10/1968 | Travis | |
| 3,448,553 A | * 6/1969 | Herr et al. .................... | 359/883 |
| 3,476,464 A | 11/1969 | Clark | |
| 3,508,815 A | * 4/1970 | Scheitlin et al. ............. | 359/883 |
| 4,174,823 A | * 11/1979 | Sutton et al. ................ | 248/582 |
| 4,488,778 A | 12/1984 | Polzer et al. | |
| 4,517,151 A | 5/1985 | Masumoto et al. | |
| 4,877,319 A | 10/1989 | Mittelhäuser | |
| 4,957,359 A | * 9/1990 | Kruse et al. ................. | 359/877 |
| 4,991,950 A | 2/1991 | Lang et al. | |
| 5,005,797 A | 4/1991 | Maekawa et al. | |
| 5,110,196 A | 5/1992 | Lang et al. | |
| 5,295,021 A | * 3/1994 | Swanson ..................... | 359/850 |
| 5,355,255 A | 10/1994 | Assinder | |
| 5,576,884 A | * 11/1996 | Ise et al. ..................... | 359/514 |
| 5,583,703 A | 12/1996 | Lang et al. | |
| 5,604,644 A | 2/1997 | Lang et al. | |
| 5,610,772 A | 3/1997 | Iizuka | |
| 5,615,054 A | 3/1997 | Lang et al. | |
| 5,621,577 A | 4/1997 | Lang et al. | |
| 5,687,035 A | 11/1997 | Lang | |
| 5,691,849 A | 11/1997 | Ledroit et al. | |
| 5,786,948 A | * 7/1998 | Gold ........................... | 359/838 |
| 5,798,882 A | 8/1998 | Lang | |
| 6,019,475 A | 2/2000 | Lynam et al. | |
| 6,217,181 B1 | 4/2001 | Lynam et al. | |

FOREIGN PATENT DOCUMENTS

| | | |
|---|---|---|
| CA | 1095008 | 2/1981 |
| DE | 1293620 | 4/1969 |
| DE | 7218365 | 5/1972 |

(List continued on next page.)

OTHER PUBLICATIONS

English Language Abstract, DE 22 56 974 B2.
English Language Abstract, DE 28 26 974.
Verified Translation G 89 05 801.1.
Verified Translation, DE 42 00 744 A1.

*Primary Examiner*—Mark A. Robinson
(74) *Attorney, Agent, or Firm*—Dority & Manning, P.A.

(57) ABSTRACT

An external mirror for motor vehicles includes a housing having a one-piece foam core and a reinforcing layer enveloping the core, at least one mirror plate, and a swivelling mechanism secured to the mirror plate and the core of the housing for movably positioning the mirror plate relative to the housing. Method for manufacturing an external mirror for vehicles includes the steps of molding a housing, embedding at least one swivelling mechanism in the housing during the molding step, and attaching a mirror plate to the swivelling mechanism.

54 Claims, 3 Drawing Sheets

FOREIGN PATENT DOCUMENTS

| | | |
|---|---|---|
| DE | 2256974 B2 | 6/1974 |
| DE | 2322901 | 11/1974 |
| DE | 7508246 | 7/1975 |
| DE | 2703105 A1 | 8/1977 |
| DE | 2629779 B2 | 7/1978 |
| DE | 2802503 A1 | 7/1978 |
| DE | 7827796 | 1/1979 |
| DE | 2537876 C3 | 8/1979 |
| DE | 2826974 | 1/1980 |
| DE | 149345 * | 8/1981 |
| DE | 3040284 A1 | 4/1982 |
| DE | G8905801.1 | 8/1989 |
| DE | 4200744 A1 | 7/1993 |

* cited by examiner

EXTERNAL MIRROR FOR MOTOR VEHICLES

BACKGROUND OF THE INVENTION

The invention is generally related to an external mirror for motor vehicles, especially for trucks or buses. The invention is more particularly related to an external mirror having unitary housing design to which various elements are readily secured.

External mirrors of various constructions have been made. Typically, external mirrors include a housing integrated with a vehicle body in some way, a mirror plate, and a swivelling mechanism inserted between the mirror plate and the housing for positioning and securing the mirror plate in an adjustable manner relative to the housing. The housing is typically an injection molded part made of heavy plastic, which is generally shaped as a trough, to which mirror elements are installed over corresponding mounting points. In order to provide the housing with necessary stability, expensive ribs and reinforcements are necessary. Moreover, the mounting points—for instance, screw collets, entry borings, and the like—are installed for additional mirror parts by means of relatively costly molding tool work on the housing.

For large trucks and bus mirrors, very often tubular or plate designs are employed for the support means of the external mirrors, which are directly integrated with the mirror holder extending from the vehicle body (see, for example, EP 0 590 510 A1). The housing serves in this case only not as a cover for the back side of the mirror plate and the swivelling mechanism, but also as an aerodynamic sheathing for the external mirror. Such designs are extremely expensive and heavy.

Known multiple unit mirrors employ a complex grating type tube design, upon which the housing is simply set as a sheathing thereover. The mirror, is thus weighty and can only be produced at a high cost. In particular, the molding equipment for the production of the sheathing portion is very complex and hence expensive.

OBJECTS AND SUMMARY OF THE INVENTION

It is accordingly an object of the invention to provide an external mirror addressing and solving the above drawbacks and others of the prior art.

It is an additional object of the invention to create an external mirror that is simple and inexpensive to manufacture and assemble, and a corresponding method of assembling the external mirror.

It is another object of the invention to provide a mirror that is stable and resistant to vibration.

These objects and others are achieved by the features and corresponding method steps described and explained below. The invention provides a housing that is a self supporting, integral shaped piece from a single foam core with a reinforcing layer that covers the core. The invention provides a simple manufacture, high shape stability, minimum vibration sensitivity, and low weight. Very complex basic housing shapes can be made, as well as very large housings. These advantages will be discussed in detail below with reference to particular preferred embodiments.

Polyurethane material has been selected as a preferred plastic substance for the foam core and the reinforcing layer which is applied thereon. It suffices for the installation of the mirrors and for the related swivelling mechanism, generally, to allow for a basin shaped reception recess in the housing. In this design, the mirror plate is installed with the swivelling mechanism and, for example, affixed to the housing for a long term period by plastic tapping screws or an appropriate adhesive. Special screw collets or penetrating borings, as used in conventional devices, are not necessary, substantially reducing the technical forming process.

Due to the filling of the housing by foam material, it is possible, even during the formation of the housing, to embed within the foam core, for instance, fittings for the attachment of the housing on to the body of the motor vehicle, holder bases for the fastening of the swivelling mechanism to the housing, and cable and/or empty tubing for the electrical system, the positioning control, and the heating of the mirror plates. This too reduces the amount of the production costs for the external mirror itself and the expense of the final mounting on the vehicle. The housing can also be penetrated by an opening through the foam core, so that the housing is mountable on a retaining arm for the mirror.

The multiple unit mirror embodiment according to the present invention includes a self supporting housing, which not only serves as the support structure, but also as the sheathing of the mirror plates within the respective swivelling mechanism. The housing can be made with a relatively simple molding set up, whereby the molding costs are substantially reduced. Because of its integral structure and the stability of shape along with low response to vibration provided by the integral structure, the corresponding multiple unit mirror is well-suited for use on vehicles such as busses.

BRIEF DESCRIPTION OF THE DRAWINGS

Further features, details, and advantages of the invention can be inferred from the following description in which preferred embodiments of the invention are discussed with reference to the following figures.

DETAILED DESCRIPTION OF THE PREFERRED EMBODIMENTS

Reference will now be made in detail to the presently preferred embodiments of the invention, one or more examples of which are illustrated in the accompanying drawings.

Figure 1:
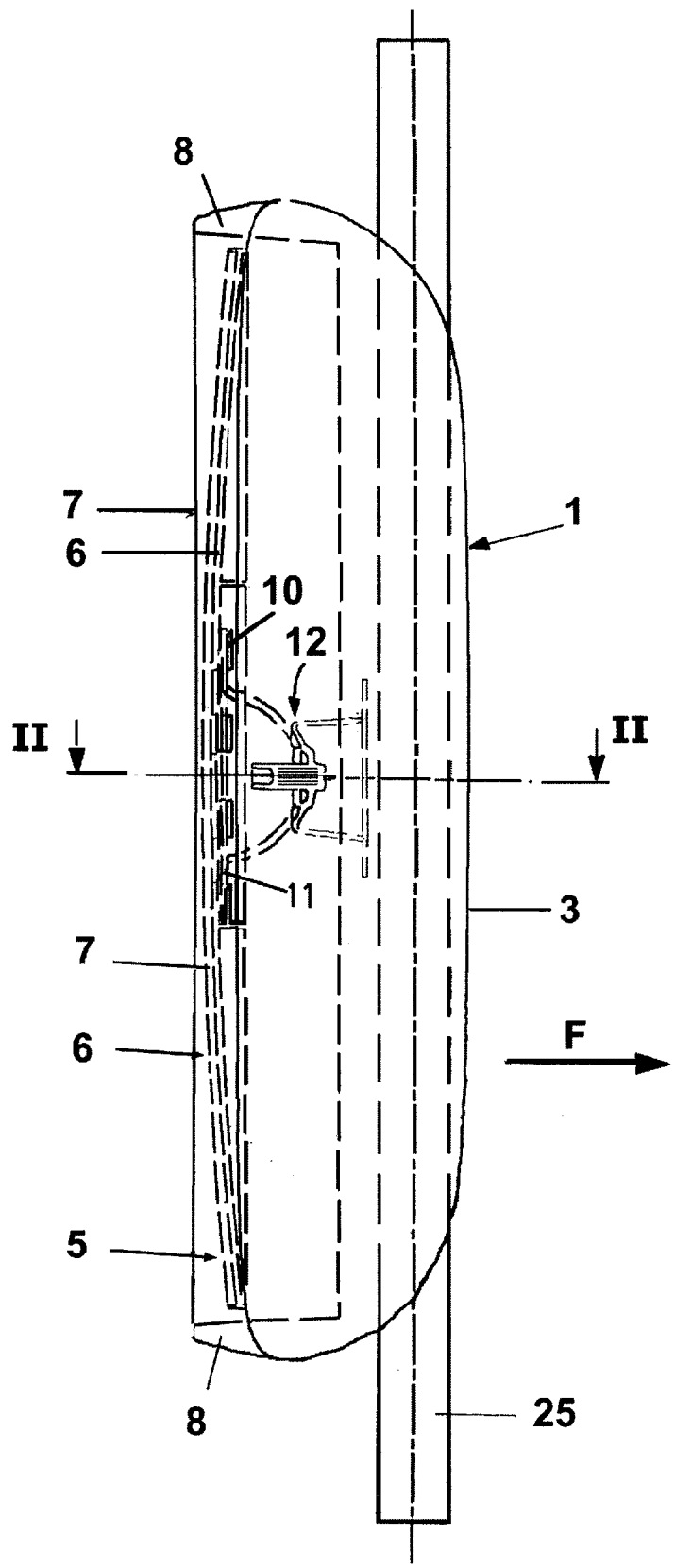
FIG. 1 is a side view of the external mirror according to a first embodiment of the invention.
Figure 2:
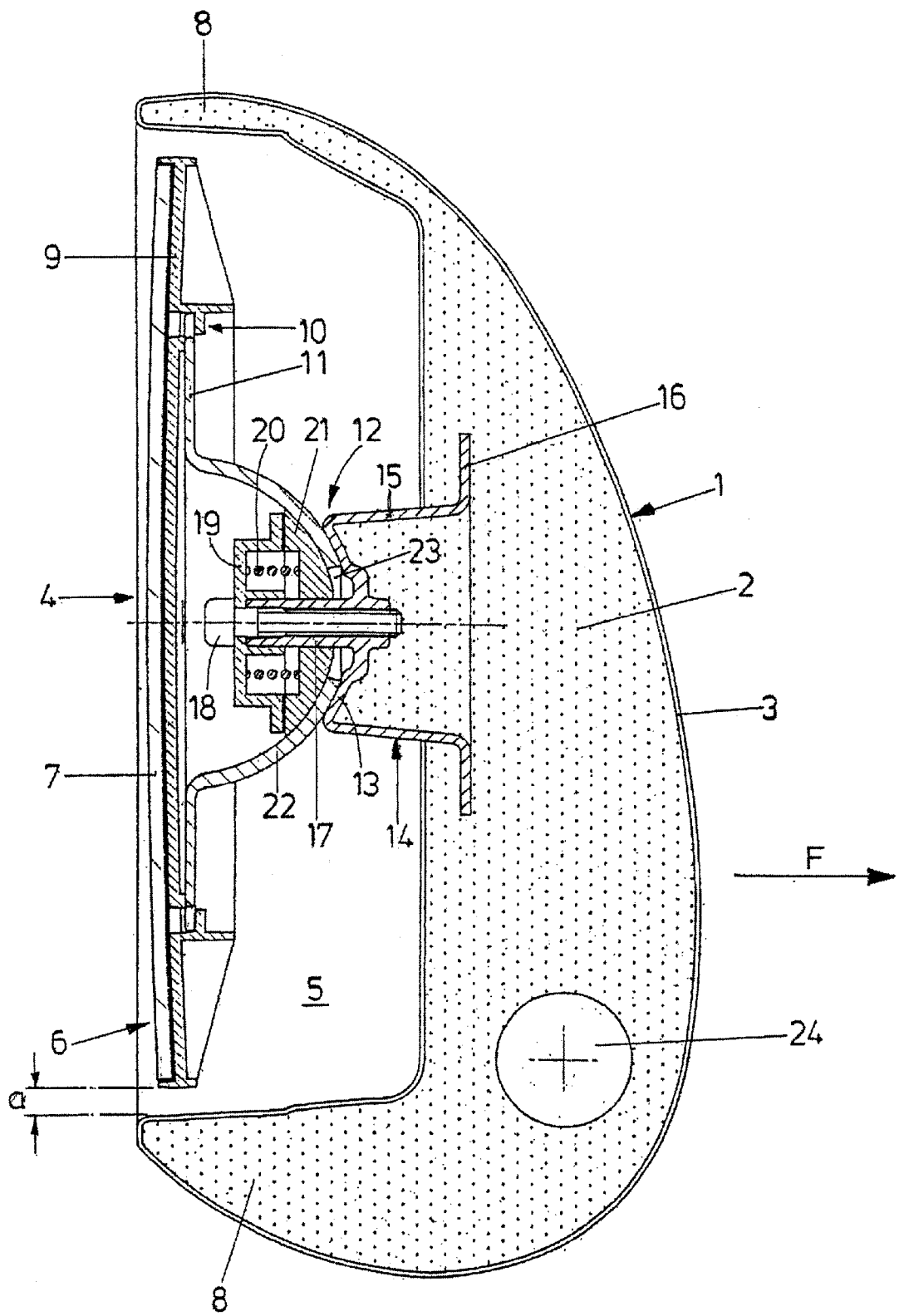
FIG. 2 is a horizontal section through the mirror along line II—II of FIG. 1.

The exterior mirror presented in FIGS. 1 and 2 includes a housing 1, the outside contour of which exhibits the convexly cambered profile common to truck mirrors. The housing 1 is designed as a self supporting, integrally shaped piece, which is made out of a one-piece foamcore 2 and a reinforcing layer 3 which totally envelopes the foam core 2. The foam core 2, which is preferably a polyurethane substance, is expressed out of an appropriate molding apparatus, and subsequently the reinforcing layer 3 (also preferably polyurethane) is sprayed thereon. The reinforcing layer 3 congeals into a smooth outer skin of a few millimeters thickness, which, together with the foam core 2, lends the necessary stability to the housing and makes it weather resistant. At the same time, the reinforcing layer 3 can be lacquered or painted to conform with the outer color of the vehicle which is being provided with the mirror. The foam core 2 and the reinforcing layer 3 are preferably comprised of polyurethane substances which can be easily chosen by persons skilled in the art.

As is particularly made clear in FIG. 2, the housing 1 includes on side 4, which is turned away from the direction of travel "F, " a receiving recess S having an opening 6 in which the mirror plate 7 is installed with an all-around clearance "a " from the stiffening surface of collar 8 of the housing which lines the recess 5. The mirror plate 7 is affixed to a plate shaped mirror carrier 9, for example, by mechanically locking or securing with adhesive. The mirror carrier 9 is fastened to a holding plate 11 by a clamping connection, as is described in the German Patent Application P 43 02 950.7 (which corresponds to U.S. patent application Ser. No. 08/245,952 now U.S. Pat, No. 5,615,054). The holding plate is bound to the housing 1 by means of a swivelling mechanism denoted generally by 12, whereby the mirror plate 7 is installed in the housing 1 in a swivelable manner.

The swivelling mechanism 12 is designed as a ball joint, whereby a bearing shell 13 of the ball joint is integrally formed as part of a socket piece 14. A side wall portion 15 of the socket piece 14 extends from the bearing shell 13 with a conical frustum shape that terminates in a ring shaped, encircling collar 16. As shown in FIG. 2, the collar 16 and the adjacent portions of walls 15 of the socket 14 are embedded within the foam core 2 of the housing 1, whereby a firm connection between the socket 14 and the housing 1 is achieved. The foam material, in this arrangement, completely fills the inner volume of the socket 14.

The bearing shell 13 includes in its one-piece construction a centrally located, axially protruding threaded sheath 17 within which a securing screw 18 holds a thrust bearing cap 19 in place on the end of the threaded sheath 17. In the interior of the thrust bearing cap 19 is compressed a spring 20, which acts against a spherical segment shaped detent element 21 in the direction of the bearing shell 13 of the swivelling mechanism 12. Between the detent element 21 and the bearing shell 13 is a hemispherical opposed bearing shell 22 fitted on the holding plate 11 for the mirror holder 9. The opposed bearing shell 22 includes a central opening 23 through which, with some play, the threaded sheath 17 penetrates.

As may further be made clear from FIG. 2, the housing 1 includes a vertical opening 24 extending through the housing by means of which the housing 1 can be mounted on a tubular holding arm 25. The housing 1 can be stably bound to the holding arm 25 by screws which are not shown.

Figure 3:
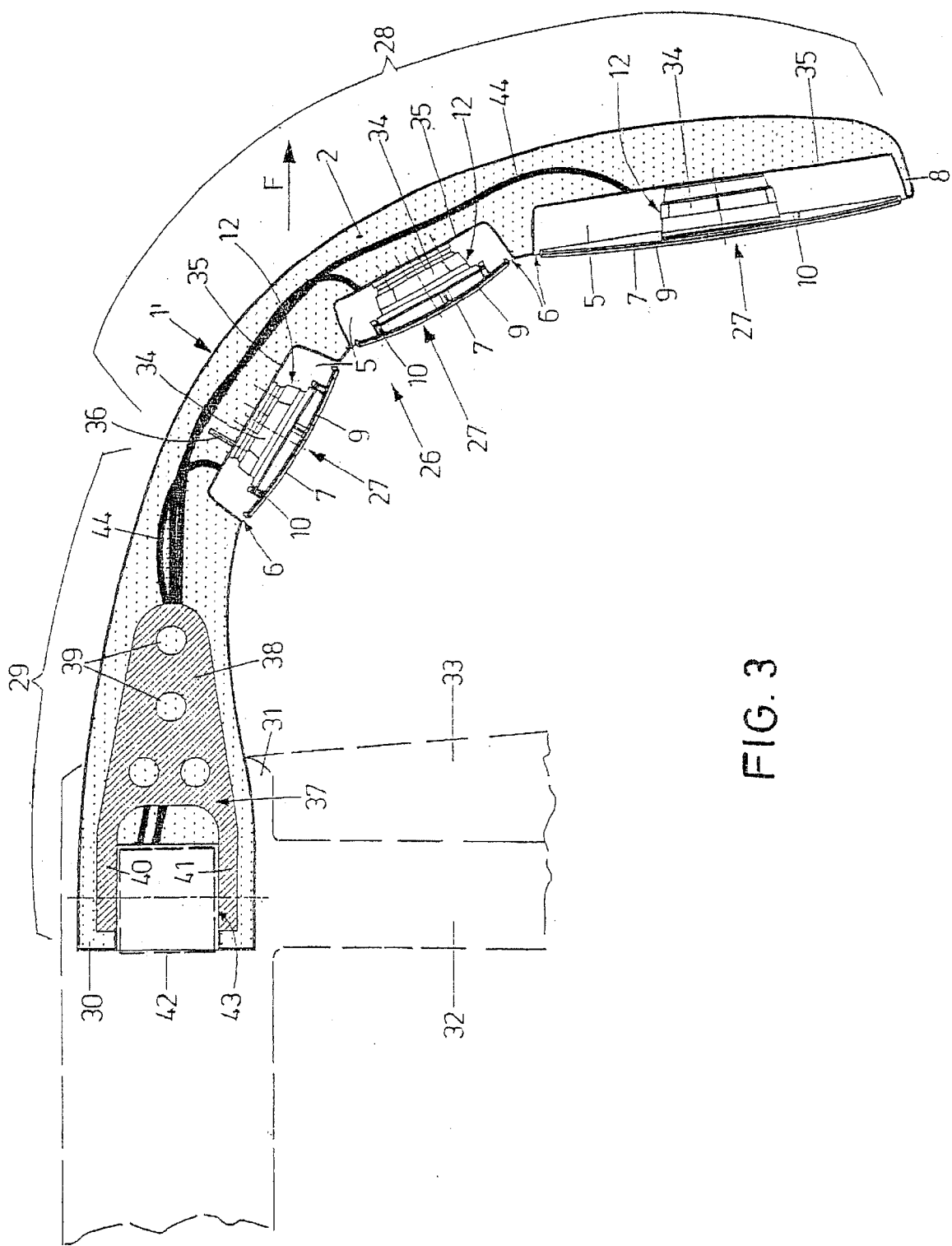
FIG. 3 is a longitudinal section through a multiple unit mirror according to a second embodiment of the invention.

The exterior mirror depicted in FIG. 3 is designed as a multiple unit mirror, the housing 1' of which runs in a somewhat quarter-circular arc, viewed in a plane parallel to the ground, and with substantially vertical surfaces (vertical to the drawing plane of FIG. 3). The housing 1' is made from a foam core 2 and a reinforcing layer 3 which envelopes the foam core 2. In the concave inner side 26 of the housing 1' are three mirror assemblies 27 arranged next to one another covering some ⅔ of the length of the arc of the housing 1'. Extending from this section, called the "mirror zone 28, " of the housing 1' is found an anchoring segment 29, the end 30 of which, i.e. the end of the exterior mirror, is affixed to a bus. To make clear this installation of the exterior mirror on the bus, the latter is indicated by dotted lines, whereby in FIG. 3 the forward roof end 31, the so-called A-column 32 of the bus body, and the front pane 33 are recognizable.

The mirror assemblies 27 are placed once again in the respective receiving recess 5 in the housing 1'. Each mirror assembly 27 includes swivelling modules 34 held respectively in place on the innermost wall 35 of the recess 5 by means of plastic self tapping screws 36. The swivelling modules 34 are of conventional construction and possess integrated swivelling motors. On the side of the swivelling module 34 remote from the back plate 35, a holding plate is installed as before, upon which the mirror carrier 9 of the mirror plate 7 is fastened by means of the mentioned clamping connection 10. The mirror plates 7 lie again in the area of the opening 6 of the receiving recess 5.

In the anchoring segment 29 of the housing 1', a gable shaped fitting base 37 is embedded in the foam core 2 of the housing 1', whereby an anchoring plate of the fitting base 37 is enveloped by the foam core 2 on all sides, and by means of the openings 39 is penetrated by the foam core 2. In this way, an intimate connection between the fitting base 37 and the foam core 2 is achieved. Extending from an anchoring plate 38 are two side bars 40, 41, which are surrounded by the foam core on the outer surfaces. Between the opposing inner sides of bars 40, 41, the foam core is excised (cut-out 43) so that the two side bars 40, 41 of the fitting base 37 can be pushed on to a support bracket 42 on the forward roof end 31 of the bus body and subsequently affixed this with screws. Thus, a simple yet stable securement of the external mirror to the body is guaranteed.

As is further made clear from FIG. 3, in the foam core 2 of the housing 1', empty tubes 44 made of thin, stable shaped hose are embedded, which generally run from the cutout 43 to the receptacle recesses 5 with the terminal end opening in the area of the back plate 35. Electrical power lines and control cables can be run through these tubes 44 to serve the swivelling module 34 and possibly a mirror heating means if such is provided. Again the wiring of these electrical components can be carried out with ease. As an alternative, the cables can be embedded directly in the foam core 2 by laying the cables in the molding equipment.

It should be apparent to those skilled in the art that various modifications and variations can be made in the present invention without departing from the scope and spirit of the invention. It is intended that the present invention includes such modifications and variations as come within the scope of the appended claims and their equivalents.

What is claimed is:

1. An external mirror for a motor vehicle comprising:
   a housing including a self supporting one-piece foam core;
   at least one mirror plate;
   a swivelling mechanism secured to the mirror plate and attached to the housing solely via the core of the housing for movably positioning the mirror plate relative to the housing; and
   means for mounting the housing to the motor vehicle, the means for mounting being spaced from the swiveling mechanism, the core supporting the swiveling mechanism relative to the means for mounting exclusive of any supporting structure connected to the means for mounting.

2. An external mirror as recited in claim 1, wherein the core includes polyurethane.

3. An external mirror as recited in claim 1, wherein the housing includes at least one recess in which the mirror plate and the swivelling mechanism are secured.

4. An external mirror as recited in claim 1, wherein the means for mounting includes a fitting piece embedded in the core for securing the housing to the vehicle.

5. An external mirror as recited in claim 1, wherein the means for mounting includes an opening extending through the core of the housing, the mirror further including an arm extending through the opening for attaching the mirror to the vehicle.

6. An external mirror as recited in claim 1, wherein the swivelling mechanism includes a socket portion embedded in the core and a bearing shell portion pivotably secured to the socket portion and fixedly secured to the mirror plate.

7. An external mirror according to claim 1, further including tubing for receiving cables for controlling functions of the mirror plate embedded within the core.

8. An external mirror according to claim 1, further including cables for controlling functions of the mirror plate embedded within the core.

9. An external mirror according to claim 1, wherein the at least one mirror plate includes a plurality of mirror plates and the external mirror includes a plurality of swivelling mechanisms respectively connected, the housing including a concave interior in which the mirror plates and swivelling mechanisms are arranged.

10. An external mirror as in claim 1, wherein the housing further includes a reinforcing layer enveloping the core.

11. An external mirror as recited in claim 10, wherein the housing includes at least one recess in which the mirror plate and the swivelling mechanism are secured.

12. An external mirror as recited in claim 10, wherein the means for mounting includes a fitting piece embedded in the core for securing the housing to the vehicle.

13. An external mirror as recited in claim 10, wherein the means for mounting includes an opening extending through the core of the housing, the mirror further including an arm extending through the opening for attaching the mirror to the vehicle.

14. An external mirror as recited in claim 10, wherein the swivelling mechanism includes a socket portion embedded in the core and a bearing shell portion pivotably secured to the socket portion and fixedly secured to the mirror plate.

15. An external mirror according to claim 10, further including tubing for receiving cables for controlling functions of the mirror plate embedded within the core.

16. An external mirror according to claim 10, further including cables for controlling functions of the mirror plate embedded within the core.

17. An external mirror according to claim 10, wherein the at least one mirror plate includes a plurality of mirror plates and the external mirror includes a plurality of swivelling mechanisms respectively connected, the housing including a concave interior in which the mirror plates and swivelling mechanisms are arranged.

18. An external mirror as in claim 1, wherein the reinforcing layer includes polyurethane.

19. An external mirror as in claim 1, wherein the swivelling mechanism is embedded within the core of the housing.

20. A method for manufacturing an external mirror for a vehicle comprising the steps of:
  molding a self supporting housing;
  providing a means for mounting the housing to the vehicle;
  securing at least one swivelling mechanism to the housing spaced from the means for mounting, the housing supporting the swivelling mechanism relative to the means for mounting exclusive of any supporting structure connected to the means for mounting; and
  attaching a mirror plate to the swivelling mechanism.

21. A method as recited in claim 20, wherein the molding step includes the sub-steps of:
  molding a core; and
  applying a reinforcing layer to a surface of the core.

22. A method as recited in claim 21, wherein the providing step includes embedding a fitting piece for securing the mirror to the vehicle in the housing during the molding step.

23. A method as recited in claim 21, wherein the providing step includes molding an opening extending through the housing for receiving a bar for securing the mirror to the vehicle.

24. A method as recited in claim 21, wherein the securing step includes the sub-steps of:
  embedding a socket portion of the swivelling mechanism in the housing during the molding the core step; and
  securing a bearing shell portion of the swivelling mechanism to the socket portion.

25. A method as recited in claim 21, further including the step of embedding tubing in the housing for receiving cables for controlling functions of the mirror plate during the molding the core step.

26. A method as recited in claim 21, further including the step of placing the cables in the tubing.

27. A method as recited in claim 21, further including the step of embedding cables in the housing for controlling functions of the mirror plate during the molding the core step.

28. A method as recited in claim 21, wherein the securing step includes embedding a plurality of swivelling mechanisms during the molding the core step, and the attaching step includes attaching a plurality of mirror plates, a respective one of the mirror plates being attached to a respective one of the swivelling mechanisms.

29. A method as recited in claim 20, wherein the providing step includes embedding a fitting piece for securing the mirror to the vehicle in the housing during the molding step.

30. A method as recited in claim 20, wherein the providing step includes molding an opening extending through the housing for receiving a bar for securing the mirror to the vehicle.

31. A method as recited in claim 20, wherein the securing step includes the sub-steps of:
  embedding a socket portion of the swivelling mechanism in the housing during the molding step; and
  securing a bearing shell portion of the swivelling mechanism to the socket portion.

32. A method as recited in claim 20, further including the step of embedding tubing in the housing for receiving cables for controlling functions of the mirror plate during the molding step.

33. A method as recited in claim 32, further including the step of placing the cables in the tubing.

34. A method as recited in claim 20, further including the step of embedding cables in the housing for controlling functions of the mirror plate during the molding step.

35. A method as recited in claim 20, wherein the securing step includes embedding a plurality of swivelling mechanisms during the molding step, and the attaching step includes attaching a plurality of mirror plates, a respective one of the mirror plates being attached to a respective one of the swivelling mechanisms.

36. An external rear view mirror assembly for attachment to a vehicle by a mounting member, the assembly comprising:
  a housing including a substantially solid body unitarily molded from a foam;
  an opening molded into the housing for receiving the mounting member;

a recess molded into the housing;

a swivelling mechanism secured to the housing within the recess, the swivelling mechanism spaced from and not directly attached to the mounting member, the housing supporting the swivelling mechanism relative to the mounting member exclusive of any supporting structure connected to the mounting member; and a mirror plate attached to and supported by the swivelling mechanism so as to be pivotable relative to the housing.

37. The assembly of claim 36, wherein the foam includes polyurethane.

38. The assembly of claim 37, wherein the housing includes a reinforcing layer formed about an outer surface of the foam.

39. The assembly of claim 38, wherein the reinforcing layer includes polyurethane sprayed on the foam.

40. The assembly of claim 36, wherein the swivelling mechanism is embedded within the housing.

41. The assembly of claim 36, wherein the swivelling mechanism is attached to the housing.

42. The assembly of claim 36, further including tubing embedded within the housing for receiving cables for controlling functions of the mirror plate.

43. The assembly of claim 36, further including cables for controlling functions of the mirror plate.

44. The assembly of claim 36, further including the mounting member, wherein the mounting member is a mounting bar.

45. An external rear view mirror assembly for attachment to a vehicle, the assembly comprising:

a housing including a substantially solid body unitarily molded from a foam, housing having a first end for attachment to the vehicle and a second end extending away from the first end;

a mounting member molded into the first end of the housing;

a recess molded into the housing between the first end and the second end;

a swivelling mechanism secured to the housing within the recess, the swivelling mechanism spaced from and not directly attached to the mounting member, the housing supporting the swivelling mechanism relative to the mounting member exclusive of any supporting structure connected to the mounting member; and a mirror plate attached to and supported by the swivelling mechanism so as to be pivotable relative to the housing.

46. The assembly of claim 45, wherein the foam includes polyurethane.

47. The assembly of claim 46, wherein the housing includes a reinforcing layer formed about an outer surface of the foam.

48. The assembly of claim 47, wherein the reinforcing layer includes polyurethane sprayed on the foam.

49. The assembly of claim 45, wherein the swivelling mechanism is embedded within the housing.

50. The assembly of claim 45, wherein the swivelling mechanism is attached to the housing.

51. The assembly of claim 45, further including tubing embedded within the housing for receiving cables for controlling functions of the mirror plate.

52. The assembly of claim 45, further including cables for controlling functions of the mirror plate.

53. The assembly of claim 45, wherein the housing has a plurality of the recesses the swivelling mechanisms, and the mirror plates, each of the recesses housing a respective mirror plate on a respective swivelling mechanism.

54. The assembly of claim 45, wherein the mounting member is configured to allow the housing to pivot relative to the vehicle.

* * * * *